Nov. 30, 1971 T. A. WILKINSON 3,623,166
SEPARABLE CONNECTION OF PORTABLE UNITS
WITH FLUID DUCT AND ELECTRICAL MEANS
Filed Nov. 13, 1969 3 Sheets-Sheet 1

INVENTOR.
THOMAS A. WILKINSON
BY Hill, Sherman, Meroni, Gross & Simpson ATTORNEYS

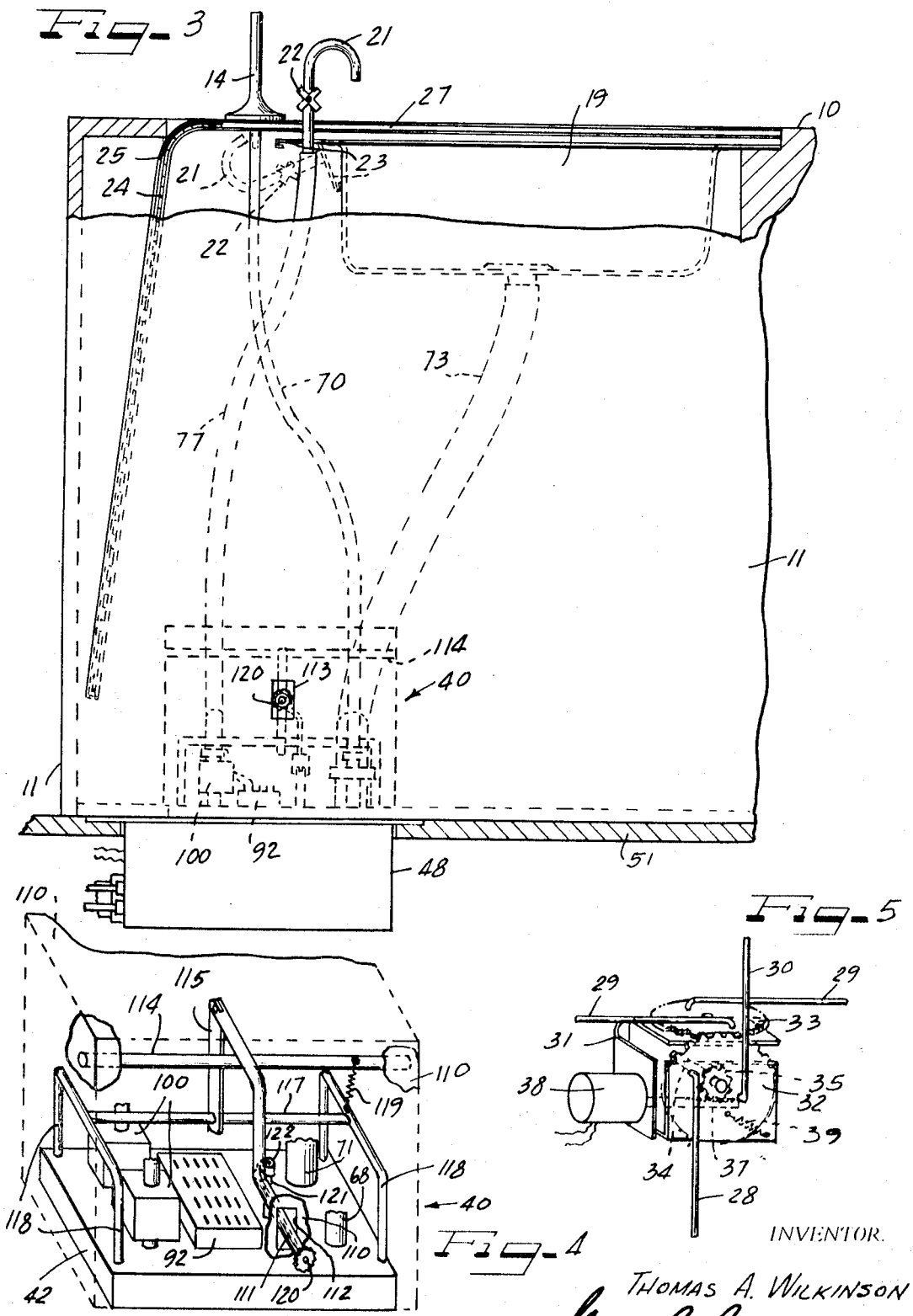

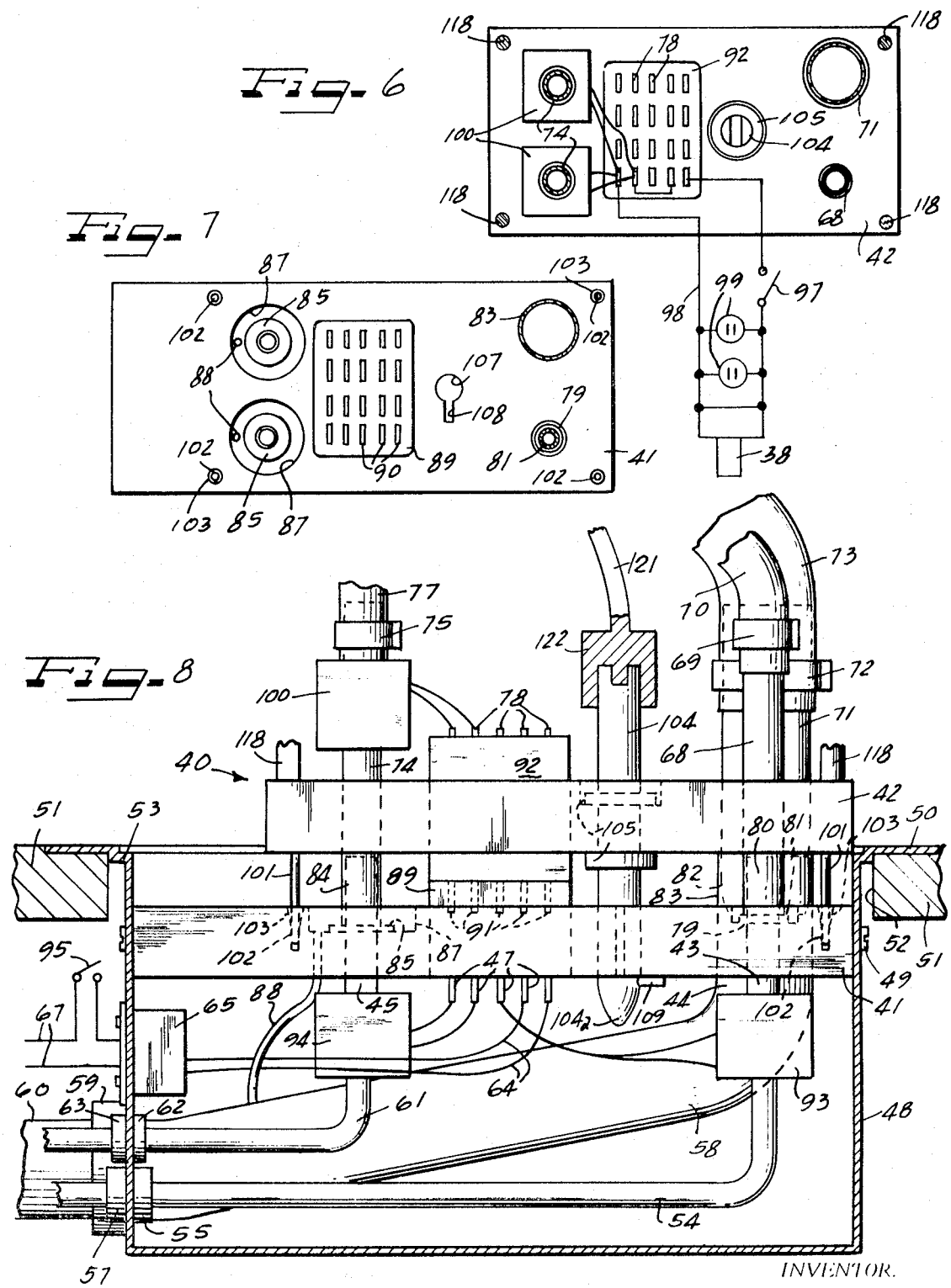

United States Patent Office 3,623,166
Patented Nov. 30, 1971

3,623,166
SEPARABLE CONNECTION OF PORTABLE UNITS WITH FLUID DUCT AND ELECTRICAL MEANS
Thomas A. Wilkinson, Patterson Drive, Rte. 1, Morris, Ill. 60450
Filed Nov. 13, 1969, Ser. No. 876,338
Int. Cl. E03c 1/00
U.S. Cl. 4—191
20 Claims

ABSTRACT OF THE DISCLOSURE

For effecting utility connections with a portable unit, it is adapted to carry connecting structure which is movable into and out of connecting relation to complementary connecting structure at a fixed location. More particularly fluid duct means and electrical means of the portable unit are adapted to be operatively connected with fluid duct means and electrical means at a fixed location by a device comprising separable complementary mounting structures respectively on the unit and at a fixed location, such structures having respective connecting means and complementary mating separable coupling elements for coupling the connecting means together, with releasable means for locking the structures together with the coupling elements mated.

---

This invention relates to the separable connection of portable units with fluid duct and electrical means.

Various portable utility units must have not only connections with fluid ducts but also electricity supply. Where such units are permanently located, no special problem resides in providing the necessary connections in a generally permanent manner. A major problem exists, however, where such units are portable and by necessity or choice must with greater or less frequency be moved for any of a great variety of reasons, among which may be mentioned to make the occupied space available for other purposes, to permit interchangeability of equipment or units, to permit storage of the units when not in use, to permit quick replacements to be made, and the like.

Among many and varied types of portable utility units falling within the ambit of consideration herein may be mentioned especially, but without limitation, classroom equipment, scientific laboratory or demonstration equipment, exhibition or display booth equipment, hospital and nursing home equipment, hotel or motel equipment, household or home recreational equipment such as back yard and patio cooking units, vending machines, mobile home or trailer court facilities, industrial equipment and machines, etc. With these and other types of portable utility units connection of ducts and electrical lines generally presents a problem. Often, such as in industrial and exhibition situations it may involve the need for services of one or more trade union crafts to effect installation and separation, and in any event may require skilled manipulation and appropriate tools.

An important object of the present invention is to provide a new and improved device for operatively connecting a portable utility unit with fluid duct means and electrical means.

Another object of the invention is to provide a new and improved device for separable connection of portable utility units with fluid duct and electrical means wherein manual effort without any special skill or experience and without the use of tools will suffice.

A further object of the invention is to provide a device for operatively connecting a portable utility unit with fluid duct and electrical means wherein quickly connectible and separable mating structures are mounted in respectively a fixed location and on the portable unit.

Still another object of the invention is to provide a new and improved device for operatively connecting a portable utility unit with fluid duct means and electrical means in a manner to adapt the same for use in a great variety of practical situations and environments enabling full use of the portable characteristics of the unit.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 3 is an enlarged fragmentary vertical sectional detail view taken substantially along the line III—III of FIG. 2;

FIG. 4 is an illustrative isometric view of the unit-carried portion of the separable connection device;

FIG. 5 is a schematic isometric view of a locking device for the table of FIGS. 1 and 2;

FIG. 6 is a top plan view of the unit-carried structure or portion of the connecting device;

FIG. 7 is a top plan view of the portion or structure of the separable connecting device which is adapated to be permanently located; and FIG. 8 is a fragmentary enlarged vertical sectional elevational detail view of the separable connecting device.

Figure 1:
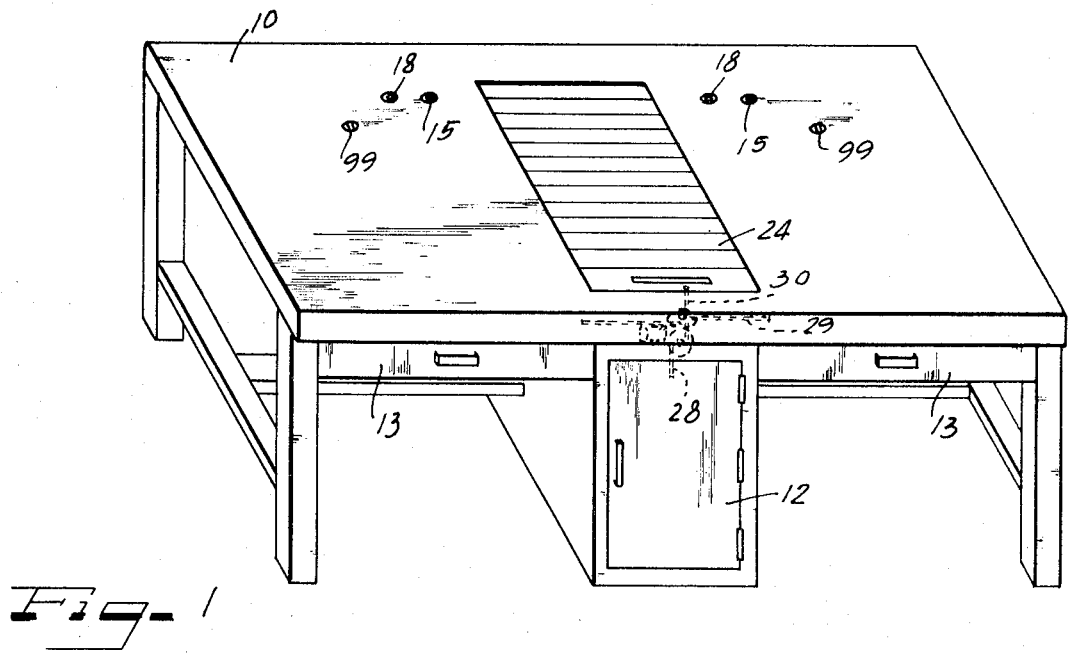
FIG. 1 is an isometric view of a classroom or laboratory table embodying features of the invention showing the same in condition for use merely as a table.
Figure 2:
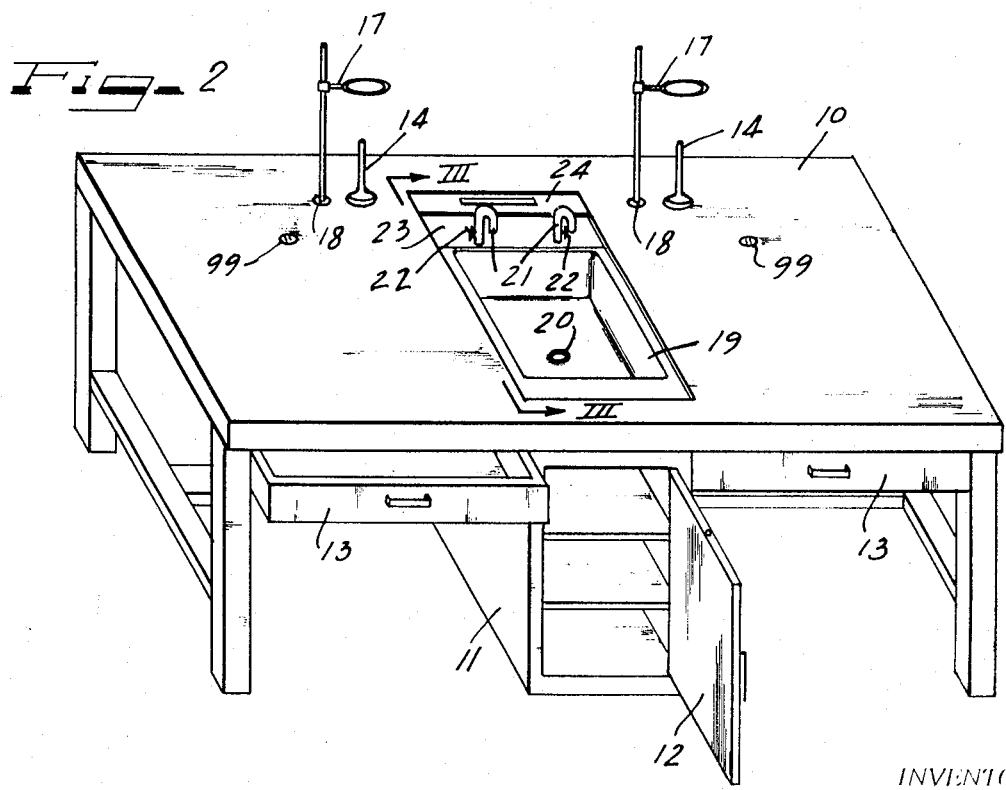
FIG. 2 is an isometric view of the same table conditioned for laboratory use and showing drawers and cabinet facilities opened for illustrative purposes.

By way of illustrating one important practical use for the invention, a classroom science or laboratory table 10 is shown in FIGS. 1 and 2, in this instance of a two person capacity having centrally thereunder and integral therewith a storage cabinet 11 which with the legs of the table extends to the floor and has a hinged door 12 for closing the front of the cabinet. Immediately under the table top at each side of the cabinet 11 are respective drawers 13 adapted to be pulled out forwardly. Adapted to be housed in the cabinet 11 or in the drawers 13 when not in use are various items useful as appurtenances with the table 10, such as Bunsen burners 14 adapted to be removably supported by the rear portion of the table and adapted to make connection with a gas supply through respective sockets 15, with suitable automatic shutoff valve means in the sockets opened by cooperating means on the base of the respective Bunsen burner when properly inserted in the socket. Associated with the Bunsen burners may be respective drop-in ring stands removably mounted in respective sockets 18 provided therefore in the rear portion of the table. When not in use the Bunsen burners and ring stands are stored in the cabinet or in the respective drawers.

Over the cabinet 11 in the central portion of the table 10 is mounted a sink basin 19 having a drain 20. For supplying water a pair of faucets 21 having suitable manual shut-off valves operated by respective handles 22 are mounted at the rear of the sink basin 19 on a panel 23. Desirably a cover 24 is provided for covering over the sink basin 19 which, for this purpose, is in suitably sunken relation to the top plane of the table 10 to accommodate the cover substantially flush with such top plane so that the entire top of the table may be used as a table when the cover is closed. Although the cover 24 may be of any preferred construction, a desirable construction comprises a roll top arrangement in which the cover comprises connected slats movably downwardly into out of the way position in the rear portion of the cabinet 11 (FIG. 3)

in a guide track 25 and with the cover being guided into closed position along extensions 27 of the track in the front to rear edges of the table defining the opening within which the sink basin 19 is mounted. In order to clear the faucets 21 from the path of the cover 24, the faucet mounting panel 23 is adapted to be swung down to move the faucets out of the way behind the sink 19, as shown in dash outline in FIG. 3.

Means are desirably provided for locking the door 12, the drawers 13 and the cover 24 in closed position when the table is not in use for laboratory purposes. For this purpose, suitable locking means are provided desirably comprising a locking bolt 28 for the door 12, respective locking bolts 29 for the drawers 13, and a locking bolt 30 for the cover 24 (FIGS. 1 and 5). These bolts are engageable in respective sockets into which and from which they are slidable. Means for operating the bolts in unison may comprise a supporting bracket 31 mounted under the front portion of the table 10 within the upper front portion of the cabinet 11 and carrying on respective right angularly disposed axes relatively rotatable and meshing bolt-actuating gears or gear plates comprising a horizontal axis gear plate 32 having the bolts 28 and 30 pivotally attached thereto at such diametrically spaced and circumferentially related positions on the plate as to be driven into locking engagement when the plate is rotated in one direction, herein counterclockwise, and to be withdrawn from locking engagement when the plate is turned in the opposite direction. Meshing with the gear plate 32 on a vertical axis is a gear plate 33 which has the bolts 29 pivotally connected thereto in a similar fashion as the bolts 28 and 30 on their gear plate, and which are operative in unison with the bolts 28 and 30 to lock and unlock the drawers by rotation of the gear plates. For rotating the gear plates, means are provided comprising a shaft 34 corotative with one of the gear plates, herein the gear plate 32, having thereon a pinion 35 which is operatively engaged by a rack 37 comprising an extension of the armature of a solenoid 38 adapted to be energized to drive the rack 37 in lock-opening direction, while means such as a spring 39 normally biases the lock into closed condition.

To render the utility unit represented by the table 10 fully portable, while yet enabling utility connection with fluid duct means and electrical means at a fixed location, a new and improved device 40 (FIGS. 3, 4 and 8) is provided comprising separable complementary mounting structures 41 and 42 adapted respectively for disposition in the fixed location and for support by the portable unit. Preferably each of the structures 41 and 42 comprises a rigid panel, either metallic or non-metallic and of such thickness, length and breadth as will serve the purpose.

On the mounting panel 41 are respective connecting means for substantially permanent communicating connection with fluid duct means and electrical means at the fixed location at which it is to be mounted. Herein such connecting means comprise, on the back of the panel 41, a gas inlet such as a nipple 43, a drain outlet 44, at least one and in this instance 2 water inlet nipples 45, and as many as necessary electrical terminals 47. To facilitate not only mounting of the panel 41 in the desired fixed location, but also to facilitate communicating connection to the several connecting means thereon of the fluid duct and electrical means at the fixed location, this panel is desirably mounted within the upper portion of a box 48, being secured therein by suitable means such as screws 49 adjacent the open end of the box which may be provided with a lateral mounting flange 50 adapted to rest against and be secured to a supporting structure such as a floor 51 having therein a receiving aperture 52 through which the box is received. Although the mounting box 48 is shown as mounted in a floor, it may with equal facility be mounted in a wall where that is more convenient or expedient. About the opening into the box, the flange 50 may be provided with an inset shoulder 53 adapted to receive a closure cover (not shown) when the fixed mounting structure is not in use. In back of the panel 41 a substantial space is provided within the box 48 to accommodate extensions of or from the connecting means to a wall of the box where connection is adapted to be made with the various fluid ducts and electrical energy source. For example, a duct extension 54 extends from the gas inlet 43 to a coupling structure 55 through which a permanent communication with a source of illuminating gas is effected by way of a supply duct 57. An extension 58 from the drain outlet 44 is adapted for permanent communication through a coupling 59 with a drain duct 60. Respective extensions 61 from the water inlets 45 are adapted to be connected by couplings 62 with water supply pipe ducts 63. A pair of electrical leads 64 attached to appropriate ones of the terminals 47 make connection through an outlet box 65 with the leads of an electrical power line 67.

Connecting means on the portable-unit-supported mounting plate 42 for connection with fluid duct means and electrical means of the unit comprise, in complementary relation to the connecting means on the plate 41, a gas connector nipple 68 to which is adapted to be connected by couplings 69 a gas tube or duct 70 for supplying the Bunsen burners 14 or other gas burning equipment to be used with the portable utility unit. A drain connecting nipple 71 on the plate 42 is adapted to be connected by a coupling 72 with a drain duct 73 leading from the drain 20 of the sink 19. For water supply, connecting members 74 are carried by the plate 42 and adapted to be joined through respective couplings 75 with delivery ducts 77 which may be flexible tubing connected with the faucets 21. For electrical connections terminals 78 are provided on the panel 42.

To enable ready separability, but efficient coupling of the connecting means on the panels 41 and 42, complementary mating separable coupling elements are provided in association with the several connecting means on the respective confronting faces of the panels 41 and 42. To this end, for effecting a gas connection, the panel 41 has a socket 79 in communication with the gas connector 43 and into which a gas coupling nipple 80 projecting from the face of the panel 42 is received with its tip sealingly engaging a washer 81 (FIGS. 7 and 8). Drain coupling is effected by projection of a nipple 82 from the panel 42 into a complementary socket 83 on the panel 41. A water coupling connection is effected by means of respective projecting coupling nipples 84 on the panel 42 extending into engagement with sealing washers 85 in respective coupling sockets 87 in the panel 41. Desirably these sockets 87 also serve as overflow drain sumps from which respective drainage ducts 88 communicate with the drain extension duct 58. Electrical coupling is effected by means of an electrical receptacle 89 mounted in the plate 41 and having respective jack sockets 90 to receive plug pins 91 of a complementary plug 92 carried by the panel 42 and whereby separable electrical connection is made between the sets of electrical terminals 47 and 78.

Means are provided for positively shutting off the gas and water when the separable mounting panels 41 and 42 are separated. To this end, a gas shut-off valve 93 is mounted to control flow through the connector 43. To the same effect, water shut-off valves 94 are provided to control flow through the connections 45. Whereas the valves 93 and 94 may be mechanically operated responsive to assembly and separation of the mounting panels 41 and 42, they are preferably electromechanically operated, as by means of conventional solenoid operating mechanism which will normally maintain the valves closed except when electrically energized or motivated only when a complete and fully functional coupling of the connecting means is in effect. Suitable electrical connection is provided between appropriate ones of the terminals 47 and the electrical control devices, that is, solenoids, of the control valve units 93 and 94. When the electrical coupling through the receptacle sockets and coupling prongs or pins 91 is completed, a feedback circuit is established through the supply leads 64 and the receptacle 89 to the coupling plug 92 and back to the connections with the terminals 47 of the control valve solenoids. However, additional control over the various fluid and electrical connections is maintained through a control switch 95 (FIG. 8) in the electrical source line 67 and which switch is desirably open when the utility unit is out of service or not to be operated to avoid premature, unintentional and unauthorized operation of any of the utility features of the unit. While the switch 95 may be mounted in the portable utility unit itself, there are various types of such utility units in respect to which the switch may be or should be mounted for remote control. For example, in a classroom it may be highly desirable for the instructor to be able to control each table 10 individually and/or all of a number of tables collectively, both for maximum security purposes and for emergency shut-down when necessary. Instead of the switch 95, or in addition thereto, a switch 97 (FIG. 6) may be located on the utility unit, such as the table 10, at a suitable place for manipulation to control all or part of the electrical means of the unit. For example, the switch 97 may be in a control circuit through suitable ones of the contacts 78 on the electrical decoupling plug 92 and comprise part of the feedback circuit previously mentioned. Whether the circuit 98 is merely an auxiliary control circuit dependent on the control switch 95 or a prime control switch with the switch 95 in control of the entire circuit, it desirably includes the lock operating solenoid 38 and any other auxiliary electrical means on the table 10 such, for example, as electrical outlets or receptacles 99.

In order to avoid runback flooding by water from the unit-carried ducts 77 upon disconnecting the water coupling elements 84, 85 and 87, and to provide a double shut-off auxiliary to the control valves 94 when the connector device 40 is fully operationally connected, each of the water connectors 74 is provided with a control valve 100 which may be mechanically operated if preferred, but is desirably electromechanically operated as by means of a suitable solenoid having electrical connection with suitable ones of the terminals 78. Through this arrangement, whenever the separable sections of the device 40 are separated either deliberately or inadvertently even though the electrical circuit may not have been broken by opening the appropriate control switch 95 or 97, as the case may be, the disconnect at the electrical connector 89, 92 will cause the solenoid for the valve 100 to deenergize and close the valve. At the same time, of course, the valves 93 and 94 will be closed. When effecting connection of the device 40, unless all of the couplings, including the electrical coupling have been properly made, none of the valves 93, 94 or 100 will open when the control switch is closed, because all of the couplings are correlated to require all of them to mate synchronously in order for the system to operate.

To assist in effecting proper alignment of the coupling elements when joining the sections of the device 40, a set of guide pins 101 is desirably provided to project from one of the confronting panel faces, herein from the face of the panel 42 into respective alignment sockets 102 in the opposite panel face, in this instance the panel 41, and which sockets are desirably provided with tapered flaring lead-in mouth ends 103.

As a safety feature and to guard against accidental separation of the panel sections 41 and 42 of the device 40, locking means are provided, in the present instance comprising a rotary locking bolt 104 carried by the panel 42 and lockingly interengageable with the panel 41. For this purpose, the bolt 104 extends as a pin rotatably through the panel 42, having spaced collars 105 thereon at opposite sides of the panel 42 to maintain a predetermined axial orientation of the bolt with a substantial end portion of the bolt extending beyond the back face of the panel 42 and a substantial length of the bolt extending beyond the coupling face of the panel to extend in the assembly through a keeper hole 107 in the panel 41 of generally keyhole shape having a lateral slot 108 longitudinally therealong to enable passage therethrough of a laterally projecting latch finger 109 on the terminal end portion of the bolt 104 which in full assembly extends entirely through and beyond the back face of the panel 41 and terminates in a tapered tip 104a. Through this arrangement, during assembly of the panel 42 with the panel 41, the latch finger is aligned with the slot 108 and the bolt projected through the keeper hole 107 until the latch finger 109 passes to the back face of the panel 41, whereupon the bolt 104 is turned to move the latch finger 109 out of registration with the clearance slot 108 and into latching engagement with the back face of the panel 41 adjacent to the keeper hole. In addition to serving as a lock, the bolt 104 also serves as alignment means for the panels and as means for sensing whether the coupling connections have all been properly and effectively completed since until that is fully accompished and the latching finger 109 has cleared through the slot 108, the bolt cannot be turned.

Although direct manual grasping and manipulation of the mounting panel 42 may be relied upon to effect operating connection or disconnection, means are desirably provided to facilitate such maneuvers by the provision of suitable means such as a handle and linkage structure as more particularly shown in FIGS. 3 and 4. To this end, the mounting panel 42 and the various elements carried thereby are desirably enclosed within a housing 110 which in the present instance is in turn housed within the cabinet 11 and opens downwardly therefrom to enable movement of the mounting panel 42 between a non-operating position entirely within the housing 40 and a coupling position contiguous to the fixed location panel 41. To effect movement of the panel 42 between the non-operating and coupled positions, an operating handle 111 extends through aligned clearance openings 112 in the side of the housing 110 and 113 in the adjacent side wall of the cabinet 11. By manually rocking the handle 111 about a fulcrum provided by a shaft 114 journalled in opposite ends of the housing 110, an inner end of the handle is adapted to be raised or lowered. Such rocking movements of the handle are transmitted to the panel 42 through a link 115 pivotally attached at one end to the inner end of the handle and at its opposite end to a symmetrical actuating frame 117 provided with preferably four symmetrically located attachment legs 118 suitably secured to the back face portion of the panel 42 as for example adjacent to the respective corners of the panel where, as in this instance, the panel is of rectangular outline. Through this arrangement, when the outer end portion of the handle 111 is lowered, the operating frame 117 is raised to move the panel 42 into its non-operating position. Conversely, when the outer end portion of the handle 111 is raised, the panel 42 is lowered into coupling position. Any suitable means such as a tensioned biasing spring 119 connected between the shaft 114 and the actuating frame 117 may be employed to maintain the panel 42 and the assembly thereon and therewith in the raised non-operating position and against which bias the lever handle 111 will move the panel 42 into its couplnig position, wherein it will be maintained against the spring bias by the locking bolt 104. To facilitate operation of the locking bolt 104, the handle 111 may be provided with a rotatable knob 120 on its outer end for operating a flexible shaft 121 extending through a portion of the handle to a coupling member 122 corotatively attached to the operating upper end of the bolt 104 so that by manipulation of the knob 120 the bolt can be moved between locking and unlocking positions. Other means for operating the locking bolt may be employed, if preferred, such as rack and pinion, solenoid, and the like. Through this arrangement, utility connection of the unit 10 can readily be made after it is moved into a position wherein the raised mounting structure panel 42 is aligned with the fixed mounting structure panel 41. In such position, operation of the handle to lower the panel 42 will effect a utility connection, and locking of the connection can be accomplished by means of a knob 120. To disconnect the device 40 after the lock has been turned to unlocking position, the spring 119 may automatically raise the panel 42, but if it cannot overcome the couplings moving the handle down will do so and cause the separated panel 42 to raise to inactive position.

Although illuminating gas and water line connections have been specifically referred to as representative, it will be understood that the connecting means disclosed may be used for other gases including air and other liquids than water, and that additional or fewer connections may be provided for, as desired or required.

I claim as my invention:

1. In a device for operatively connecting fluid duct means and electrical means of a portable utility unit with fluid duct means and electrical means at a fixed location:
   separable complementary mounting structures adapted, respectively, for disposition in said fixed location and for support by said portable unit;
   connecting means on said fixed location mounting structure for substantially permanent communicating connection with said fluid duct means and said electrical means at said location;
   connecting means on said portable-unit-supported mounting structure for connection with fluid duct means and electrical means of said unit;
   complementary mating separable coupling elements on the respective structures for coupling said connecting means together; and
   releasable means for locking said structures together with said coupling elements mated.

2. A device according to claim 1, comprising a pair of panels providing and mounting structures and having confronting faces at which said coupling elements are disposed while said connecting means are disposed at the back faces of said panels.

3. A device according to claim 2, including alignment guide means cooperatively related on said panels to facilitate assemblying the same to facilitate accurate registration of said coupling elements.

4. A device according to claim 2, wherein said locking means function as alignment means for said panels.

5. A device according to claim 2, in which said locking means comprise a rotatable bolt carried by one of said panels, the other of said panels having a keeper hole therein into which said bolt projects in the assembled relationship of the panels, and a latch projection on said bolt latchingly cooperative with said other of said panels by turning the bolt.

6. A device according to claim 5, including means operable to turn said bolt.

7. A device according to claim 1, said connecting means on said fixed location mounting structure for connection with fluid duct means including shut-off valve means.

8. A device according to claim 7, said shut-off valve means being electromechanically operated and including electrical connections requiring said coupling elements to be coupled to be operative.

9. A device according to claim 1, including shut-off valve means in control of connecting means on said portable-unit-supported mounting structure for connection with fluid duct means.

10. A device according to claim 1, including electrical circuitry adapted to be completed by mating of the coupling elements for the electrical connecting means, and having at least one electrical control switch.

11. A device according to claim 1, in combination with a portable utility unit including a plurality of fluid ducts communicating through said connecting means and said coupling elements with a plurality of fluid ducts at said fixed location.

12. A combination according to claim 11, in which one of the fluid ducts of said unit is a drain duct, and at least one of the ducts is a fluid supply duct, and means for shutting off the fluid supply at said mounting structure disposed in said fixed location when said mounting structures are separated.

13. A combination according to claim 11, including locking means on said unit electrically operable and connected with said electrical means at said location through said separable coupling elements on said mounting structures.

14. A combination according to claim 11, said unit comprising a laboratory table, and an electrical circuit including said electrical means and having a control switch located to be operated at a point remote from said table.

15. A combination according to claim 11, including means carried by said unit and operable to move the mounting structure supported thereby between separated and coupled positions relative to the mounting structure in said fixed location.

16. In combination with a portable utility unit requiring utility connections with connecting structure mounted in a fixed location:
   a separable utility connecting structure carried by said utility unit and having means for communicating connection with said fixed location connecting structure; and
   means for operating said unit-carried connecting structure between connected and separated positions relative to said fixed connecting structure when the unit is properly oriented with the connecting structures in alignment.

17. A combination according to claim 16, including means on said unit-carried structure cooperative with the fixed location structure for assuring alignment of the structures and effecting utility connection.

18. A combination according to claim 16, including means carried by said unit-carried structure for locking it in connected relation to the fixed location structure.

19. A combination according to claim 16, said unit including fluid and electrical utility outlets, and said unit-carried structure having coupling means in communication with said outlets.

20. A combination according to claim 16, including a housing mounting said unit-carried structure on said unit, said means for moving said unit-carried structure including an operating handle.

References Cited

UNITED STATES PATENTS

| | | | |
|---|---|---|---|
| 426,655 | 4/1890 | Bennett | 248—68 |
| 1,435,015 | 11/1922 | Lidberg | 108—50 |
| 2,512,108 | 6/1950 | Liptay | 4—191 X |
| | | | 248—68 |
| 2,903,711 | 9/1959 | Kesling | 4—187 X |
| | | | 4—167 |
| 2,908,017 | 10/1959 | Whaley | 4—192 X |
| | | | 4—1 |
| 3,181,484 | 5/1965 | Keppler | 248—68 X |
| | | | 108—50 |
| 3,378,963 | 4/1968 | Obata | 4—192 X |
| | | | 52—34 |

FOREIGN PATENTS

| | | | |
|---|---|---|---|
| 659,966 | 10/1951 | Great Britain | 4—195 |
| 707,867 | 4/1965 | Canada | 52—221 |

LAVERNE, D. GEIGER, Primary Examiner

D. B. MASSENBERG, Assistant Examiner